United States Patent [19]
Ellard

[11] Patent Number: 5,991,758
[45] Date of Patent: Nov. 23, 1999

[54] SYSTEM AND METHOD FOR INDEXING INFORMATION ABOUT ENTITIES FROM DIFFERENT INFORMATION SOURCES

[75] Inventor: Scott Ellard, Fremont, Calif.

[73] Assignee: Madison Information Technologies, Inc., Chicago, Ill.

[21] Appl. No.: 08/870,688

[22] Filed: Jun. 6, 1997

[51] Int. Cl.$^6$ .................................... G06F 17/30
[52] U.S. Cl. ................ 707/6; 707/2; 709/206
[58] Field of Search .................. 702/6, 513, 5; 709/206; 707/6, 2

[56] References Cited

U.S. PATENT DOCUMENTS

| | | | |
|---|---|---|---|
| 5,694,594 | 12/1997 | Chang | 707/6 |
| 5,809,499 | 9/1998 | Wong et al. | 707/6 |

Primary Examiner—Thomas G. Black
Assistant Examiner—Charles L. Rones
Attorney, Agent, or Firm—Gary Cary Ware & Freidenrich LLP

[57] ABSTRACT

A system and method for indexing a data record from an information source into a database, the database containing a plurality of data records, is provided comprising receiving a data record from an information source, the received data record having a predetermined number of fields containing information about a particular entity, standardizing and validating the data in the received data record. A system and method is also provided for retrieving records that refer to an entity characterized by a specific set of data values by comparing a predetermined number of fields within the received data record with a predetermined number of fields within the data records already in the database, selecting data records already in the database as candidates having data within some of the predetermined fields that is identical to the data in the fields of the received data record, and scoring the candidates to determine data records having information about the same entity.

29 Claims, 13 Drawing Sheets

SYSTEM AND METHOD FOR INDEXING INFORMATION ABOUT ENTITIES FROM DIFFERENT INFORMATION SOURCES

BACKGROUND OF THE INVENTION

This invention relates generally to a system and method for associating data records within one or more databases, and in particular to a system and method for identifying data records in one or more databases that may contain information about the same entity and associating those data records together for easier access to information about the entity.

Data about entities, such as people, products, or parts may be stored in digital format in a computer database. These computer databases permit the data about an entity to be accessed rapidly and permit the data to be cross-referenced to other relevant pieces of data about the same entity. The databases also permit a person to query the database to find data records pertaining to a particular entity. The terms data set, data file, and data source may also refer to a database. A database, however, has several limitations which may limit the ability of a person to find the correct data about an entity within the database. The actual data within the database is only as accurate as the person who entered the data. Thus, a mistake in the entry of the data into the database may cause a person looking for data about an entity in the database to miss some relevant data about the entity because, for example, a last name of a person was misspelled. Another kind of mistake involves creating a new separate record for an entity that already has a record within the database. In a third problem, several data records may contain information about the same entity, but, for example, the names or identification numbers contained in the two data records may be different so that the database may not be able to associate the two data records to each other.

For a business that operates one or more databases containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and prevent the, user from picking the wrong data record, it is also desirable to identify and associate data records from the various information sources that may contain information about the same entity. There are conventional systems that locate duplicate data records within a database and delete those duplicate data records, but these systems only locate data records which are identical to each other. Thus, these conventional systems cannot determine if two data records, with for example slightly different last names, nevertheless contain information about the same entity. In addition, these conventional systems do not attempt to index data records from a plurality of different information sources, locate data records within the one or more information sources containing information about the same entity, and link those data records together.

Thus, there is a need for a system and method for indexing information about entities from a plurality of different information sources which avoid these and other problems of known systems and methods, and it is to this end that the present invention is directed.

SUMMARY OF THE INVENTION

The invention provides a master entity index system and method which indexes data records within one or more information sources and determines which data records within the one or more information sources may contain information about the same entity. The master entity index system may also link data records containing information about the same entity so that a search for that particular entity will retrieve all of the data records that are linked together. The master entity index may have an entity database for tracking logically related data records and one or more control databases for controlling the logical relations made between data records, and an exception occurrence database to record the (exceptional conditions that have occurred. The master entity index system may also permit a plurality of users to query the master entity index to access information contained within the information sources about an entity, add or update data in one of the data records or monitor the operation of the master entity index.

The invention provides a method for correctly and properly identifying an entity referred to in a data record to provide a method for assisting in locating all data records relating to an entity within one or more information sources. The method includes receiving data records containing information about a particular entity from one or more information sources, and indexing and storing in a database predetermined fields within the received data records.

The entity database of the master entity index system may be divided into a data records storage database for storing the actual data records and a link database for storing the links between the data records containing information about the same entity. Thus, the storage of the data records is separate from the storage of the links between the data records which makes the master entity index system more flexible. The one or more control databases may permit the operator of the master entity index to customize the operation of the master entity index.

The master entity index system may process new data records and compare them to data records existing in the master entity index to locate data records containing information about the same entity. The matching operation may use one or more combinations of attributes to retrieve a plurality of candidates, generate a confidence level for each candidate and return data records to the user only which have confidence levels greater than or equal to a specified threshold level or that have been specified as identical in the rule database. The threshold level may be adjusted and the retrieval of the candidates may use historical data about an entity during the query.

Thus, in accordance with the invention, a system and method for indexing a data record from an information source into a database, the database containing one or more types of data records, is provided comprising receiving a data record from an information source (an application system, a data file, or human input), the received data record having a predetermined number of fields containing information about a particular entity, standardizing and validating the data in the received data record. A system and method is also provided for retrieving records that refer to an entity characterized by a specific set of data values by comparing a predetermined number of fields within the received data record with a predetermined number of fields within the data records already in the database, selecting data records already in the database as candidates having data within some of the predetermined fields that is identical to the data in the fields of the received data record, and scoring the candidates to determine data records having information about the same entity.

DETAILED DESCRIPTION OF A PREFERRED EMBODIMENT

The invention is particularly applicable to a system and method for indexing information about participants in a health care system from a plurality of different information sources. It is in this context that the invention will be described. It will be appreciated, however, that the system and method in accordance with the invention has utility in a large number of business applications that involve identifying and associating information about entities.

Figure 1:
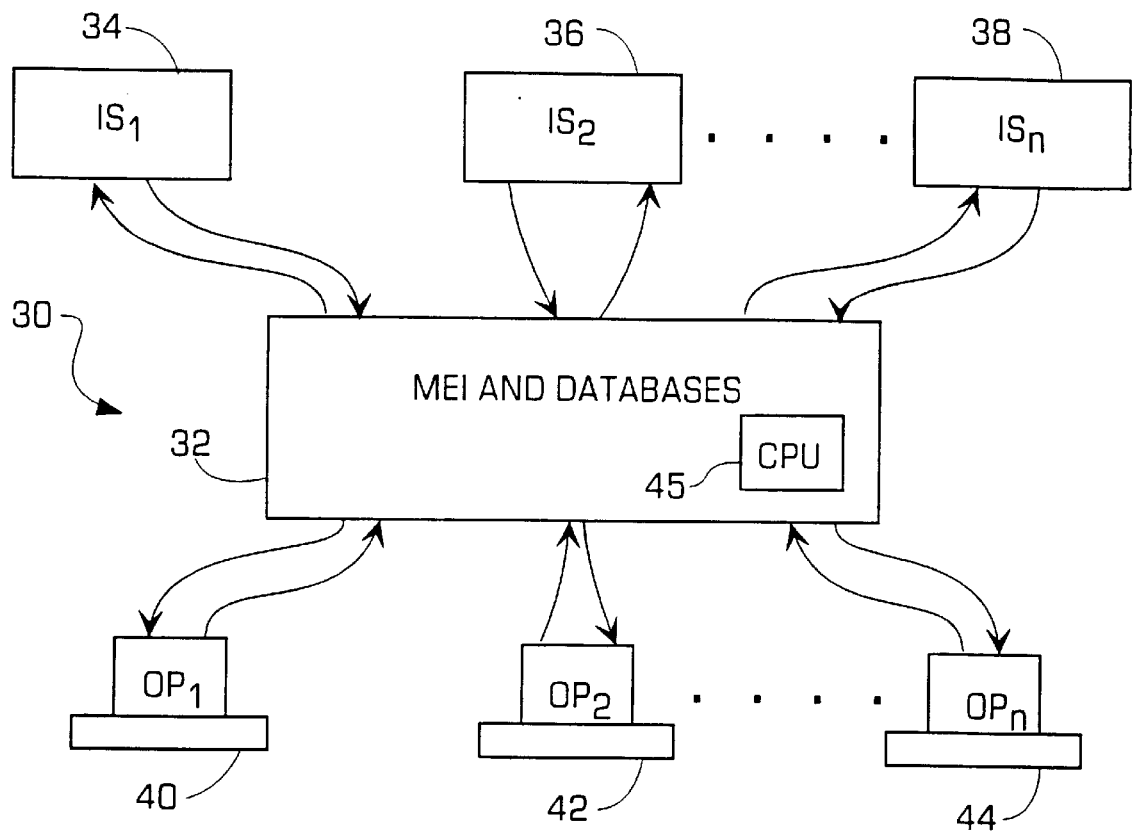
FIG. 1 is a block diagram illustrating a database system that may include a master entity index system in accordance with the invention.

FIG. 1 is a block diagram illustrating a master entity index system 30 in accordance with the invention. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. The entities tracked using the MEI may include for example, patients in a hospital, participants in a health care system, parts in a warehouse or any other entity that may have data records and information contained in data records associated with it. The MEI may be a computer system with a central processing unit 45 executing a software application that performs the function of the MEI. The MEI may also be implemented using hardware circuitry.

As shown, the MEI 32 may receive data records from the information sources as well as write corrected data back into the information sources. The corrected data communicated to the information sources may include information that was correct, but has changed, information about fixing information in a data record or information about links between data records. In addition, one of the users 40–44 may transmit a query to the MEI 32 and receive a response to the query back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York. The MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by a communications network, such as a wide area network. The MEI may have its own database that stores the complete data records in the MEI, but the MEI may also only contain sufficient data to identify a data re-cord (e.g., an address in a particular information source) or any portion of the data fields that comprise a complete data record so that the MEI retrieves the entire data record from the information source when needed. The MEI may link data records together containing information about the same entity in an entity identifier or associative database, as described below, separate from the actual data record. Thus, the MEI may maintain links between data records in one or more information sources, but does not necessarily maintain a single uniform data record for an entity. Now, an example of the master entity index system for a health care organization in accordance with the invention will be described.

Figure 2:
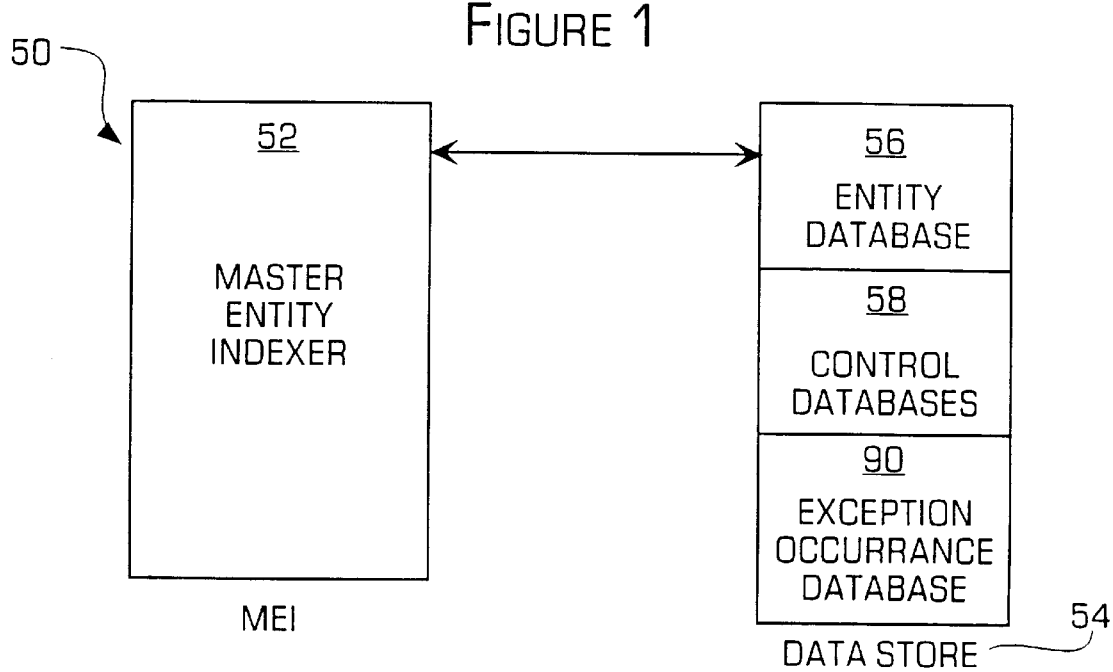
FIG. 2 is a block diagram illustrating a master entity index system and its associated databases in accordance with the invention.

FIG. 2 is a block diagram illustrating an example of a master entity index system 50 for a health care organization. In this example, the master entity index system may include a master entity index 52 and a data store 54. For clarity, the one or more information sources and the multiple users are not shown, but are connected to the master entity index 52 as previously described. The data store 54 may include an entity database 56, one or more control databases 58, and an exception occurrence database. The entity database may store the data from the data records as specified above from the one or more information sources and may separately store links between one or more data records when those data records contain information about the same entity. The entity database may also store an address of a large data record stored in one of the information sources to reduce the storage requirements of the entity database. In this example, the information about entities within the data records may be information about patients within a plurality of hospitals which are owned by a health care organization. The MEI 52 may process the data records from the one or more information sources located at each hospital, identify and associate records that contain information about the same entity, and generate the links between the separate data records when the data records contain information about the same patient.

As data records from the information sources are fed into the MEI, the MEI may attempt to match the incoming data record about an entity to a data record already located in the MEI database. The matching method will be described below with reference to FIG. 15. If the incoming data record matches an existing data record, a link between the incoming data record and the matching data record may be generated. If the incoming data record does not match any of the existing data records in the MEI, a new entity identifier, as described below, may be generated for the incoming data record. In both cases, the incoming data record may be stored in the MEI. Then as additional data records are received from the information sources, these data records are matched to existing data records and the MEI database of data records is increased.

The one or more control databases 58 may be used by the MEI to control the processing of the data records to increase accuracy. For example, one of the control databases may store rules which may be used to override certain anticipated erroneous conclusions that may normally be generated by the MEI. For example, the operator of the MEI may know, due to past experience, that the name of a particular patient is always misspelled in a certain way and provide a rule to force the MEI to associate data records with the known different spellings. The control databases permit the operator to customize the MEI for a particular application or a particular type of information. Thus, For a health care system containing information about a patient, the control databases may contain a rule that the nickname "Bill" is the same as the full name "William." Therefore, the MEI will determine that data records otherwise identical except for the first name of "Bill" and "William" contain information about the same entity and should be linked together. The MEI will now be described in more detail.

Figure 3:
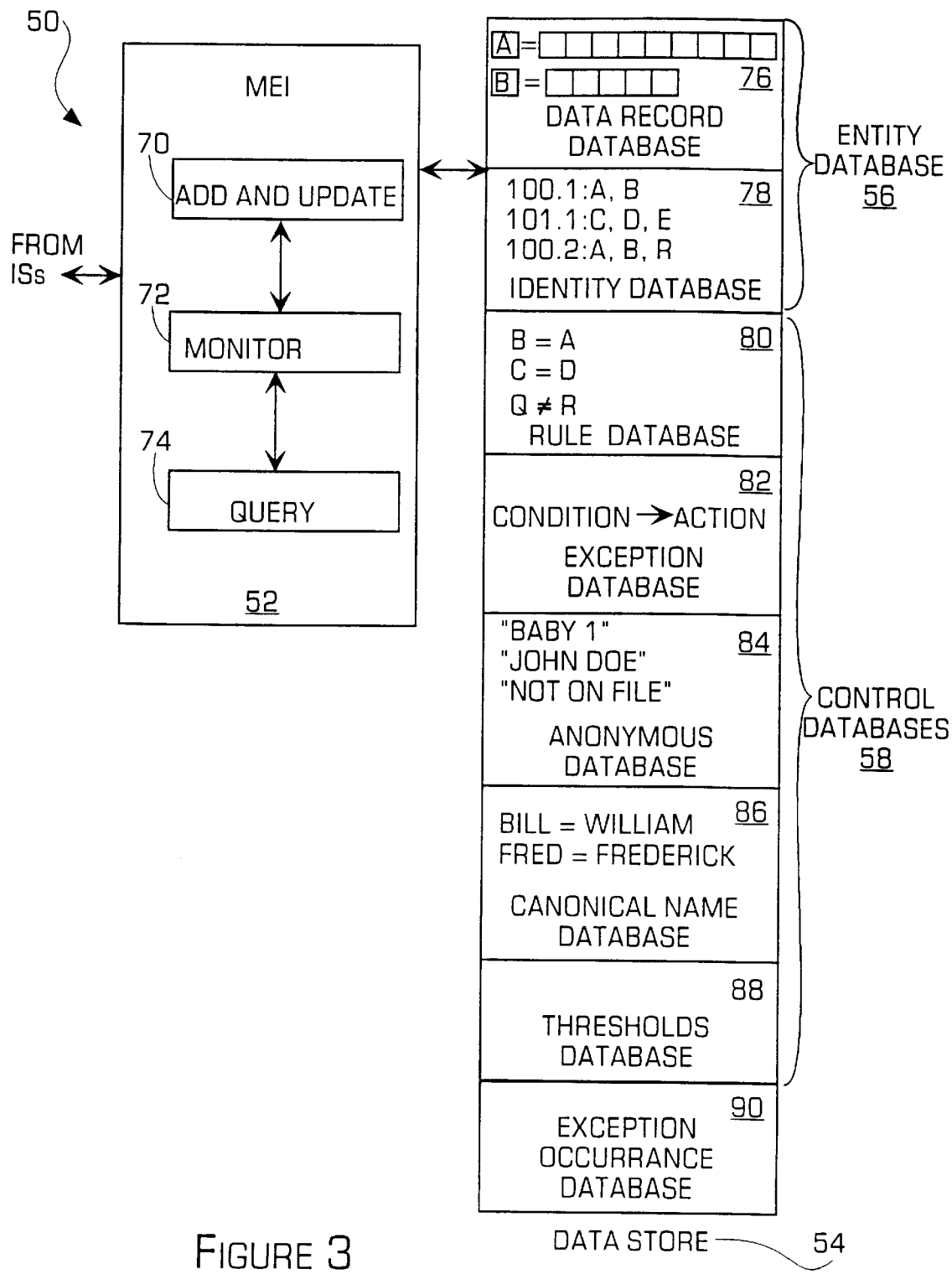
FIG. 3 is a block diagram illustrating more details of the database that are associated with the master entity index.

FIG. 3 is a block diagram illustrating more details of the master entity index system 50, and in particular the MEI 52 and the data store 54. The MEI 52 may include an addition and updating unit 70, a monitor unit 72 and a query unit 74. The addition and updating unit may add data records about a new entity into the data store, update data records in the data store, or add new rules to the control databases. The monitor unit may permit a user of the master entity index system to view special conditions, known as exceptions, generated by the MEI. For example, a data record that requires a person to view the data record due to an error may be tagged and a message to the operator may be generated. The query unit permits a user of the master entity index system to query the MEI about information in the data records or information in the control databases of the MEI and the MEI will return a response to the query including any relevant data records or information. More details of these units and their associated functions will be described below.

For each of the operations of the MEI, including the synthesis, as described below, the querying and the monitoring, the results of those operations may depend on a trust value that may be associated with each data field in a data record. The trust computation for a data field may vary depending on the characteristics of the data field, such as the date on which that data record containing the field was received, or a quantitative characterization of a level of trust of the information source. For example, a data field containing data that was manually entered may have a lower trust value than a data field with data that was transferred directly from another information source. The trust value for a data field may also affect the probability of the matching of data records. Now, the data store 54 of the master entity index system will be described in more detail.

The MEI may provide other operations that can be constructed from combining the operations listed above. For example, an operation to process data records for which it is not known if a data record exists can be constructed by combining the query operation for data records with the add new data record or update existing data record operations. These "composite" operations may lead to better performance than if the operator executed a combination of the basic operations. They also relieve the operator for having to determine the correct sequencing of operations to achieve the desired result.

The data store 54 may include an entity database 56, one or more control databases 58, and an exception occurrence database 90 as described above. The entity database may include a data record database 76 and an identity database 78. The data record database may store the data records or the addresses of the data records in the MEI, as described above, while the associative identity database may store a group of data record identifiers that associate or "link" those data records which contain information about the same entity. The separation of the physical data records from the links between the data records permits more flexibility because a duplicate copy of the data contained in the data record is not required to be present in the identity database. The data record database and the associative database may also be combined if desired.

The identity database represents the combination of data records in the data record database that refer to the same entity. Each entity is assigned an entity identifier. Entity identifiers are based on the concept of "versioned" identification. An entity identifier consists of a base part and a version number. The base part represents a specific individual about whom information is being linked. The version number represents a specific combination of data records that provides information about the entity that is known at a specific time. In this example, the data records are shown as squares with the alphabetic identifier of the data record inside, and the entity identifier is shown as the base part followed by a period followed by a version number. For example, "100.0" indicates an entity identifier with 100 as the base part and 1 as the version number. In this example, entity identifier 100.0 links data records A and B, entity identifier 101.0 links data records C, D and E, and entity identifier 101.1 links data records A, B, and R. Now, the details of the control databases will be described.

The one or more control databases 58 may permit the operator of the master entity index system to customize the MEI's processing based on information known to the operator. The control databases shown are merely illustrative and the MEI may have additional control databases which further permit control of the MEI by the operator. The control databases may, for example, include a rules database 80, an exception handling database 82, an anonymous name database 84, a canonical name database 86, and a thresholds database 88.

The rules database may contain links that the operator of the system has determined are certain and should override the logic of the matching of the MEI. For example, the rules database may contain identity rules (i.e., rules which establish that a link exists between two data records) and/or non-identity rules (i.e., rules which establish that no link exists between two data records). In this example, the rules database contains identity rules which are A=B and C=D and a non-identity rule which is Q≠R. These rules force the MEI to establish links between data records or prevent links from being established between data records. For example, the information sources may have four patients, with data records S, T, U, and V respectively, who are all named George Smith and the operator may enter the following nonidentity rules (i.e. S≠T, T≠U, U≠V, V≠S) to keep the data records of the four different entities separate and unlinked by the MEI. The rules in the rules database may be updated, added or deleted by the operator of the master entity index system as needed.

The exception handling database 82 contains one or more exception handling routines that permit the master entity index system to handle data record problems. The exception handling rules within the database may have the form of "condition→action" processing rules. The actions of these rules may be actions that the MEI should automatically take in response to a condition, for example, to request that an individual manually review a data record. An example of a exception handling rule may be, "if duplicate data record→delete data record" which instructs the MEI to delete a duplicate data record. Another example is, "if different attributes (sex)→request further review of data record" which instructs the MEI that if there are two data records that appear to relate to the same entity, but the sex of the entity is different for each data record, the MEI should request further review of the data records. In response to this request, an operator may determine that the data records are the same, with a incorrectly typed sex for one of the records and the operator may enter a rule into the rules database that the two data records are linked together despite the difference in the sex attribute. The exception database may have an associated database 80 (described below) which stores the actual exceptions that occur during processing of the input data records.

The anonymous name database 84 permits the MEI to automatically recognize names that should be ignored for purposes of attempting to match two data records. In this example, the anonymous name database may contain "not on file", "john doe" and "baby_1" which are names that may be typically assigned by a hospital to a patient when the hospital has not yet determined the name of the patient. As another example, a part not in a warehouse inventory may be referred to as "not on file" until the part may be entered into the database. These anonymous names may be used by the MEI to detect any of the anonymous names or other "filler" data that hold a space, but have no particular meaning in data records and ignore those names when any matching is conducted because a plurality of data records containing the name of "john doe" should not be linked together simply because they have the same name.

The canonical name database 86 may permit the MEI to associate short-cut data, such as a nickname, with the full data represented by the short-cut data, such as a person's proper name. In this example for a health care organization, the nickname Bill may be associated with William and Fred may be associated with Frederick. This database permits the MEI to link together two data records that are identical except that one data record uses the first name Bill while the second data record uses the first name William. Without this canonical name database, the MEI may not link these two data records together and some of the information about that patient will be lost. The thresholds database 88 permits the thresholds used by the MEI for matching data records, as described below, to be adjustable. For example, an operator may set a high threshold so that only exact data records are matched to each other. A lower threshold may be set so that a data record with fewer matching data fields may be returned to the user in response to a query. The details of the matching method will be described below in more detail.

The exception occurrence database 80 allows the MEI to maintain a record of all of the exceptions that have occurred. The exception occurrence database may store the actual exception conditions that have arisen during processing. For example, the exception occurrence database may contain an entry that represents that entity 100.2 has two data records with different values for the "sex" attribute.

The operator of the MEI may clear the identity database 78 without clearing the data record database 80. Thus, an operator may have the MEI receive a plurality of input data records and generate a plurality of links with a particular matching threshold level, as described below, being used. The operator may then decide to perform a second run through the data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data. Now, a method of adding or updating data in the master entity index in accordance with the invention will be described.

Figure 4:
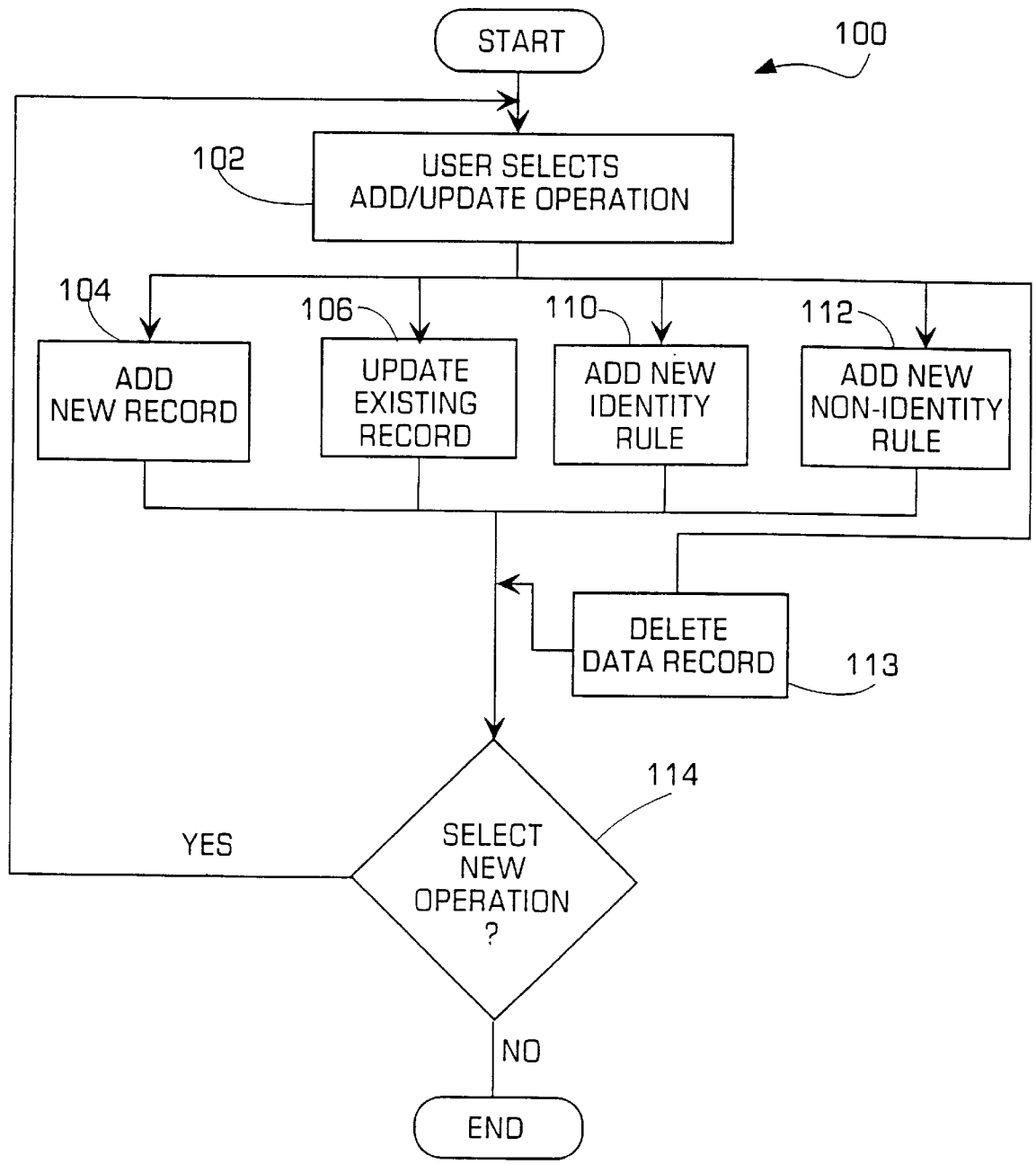
FIG. 4 is a flowchart illustrating a plurality of input operations that may be executed by the master entity index of FIG. 2.

FIG. 4 is a flowchart illustrating a method 100 for adding or updating data within the master entity index system. The user selects an add/update operation in step 102 which permits the user to select, for example, an add new data record operation 104, an update an existing data record operation 106, an add new identity rule 110, an add new non-identity rule 112, and a delete data record operation 113. The add new data record operation permits a user of the MEI to add a new data record containing information about an entity into the MEI while the update an existing data record operation permits a user of the system to update the data record or information about an entity that already exists within the MEI. The add identity and add non-identity rule operations permit the user to add identity or nonidentity rules into the rules database 80 shown in FIG. 3. The delete operation permits the user of the MEI to delete a data record from the data records database. Each of these operations will be described in more detail below with reference to FIGS. 7–12. The MEI may then determine whether there are additional addition or updating operations to perform in step 114 based on the user's response and either exit the method or return to step 102 so that the user may select another addition or updating operation. The add/update/delete operation may also be used for the control databases to add/update information in those databases, and additional processing may occur due to changes in the control databases which may change the identity database. In all of those cases, the additional processing is to identify the existing identity records that are impacted by the modification, and to use the match/link operation to re-compute the appropriate entries in the identity database. For example, removing a record for the anonymous name database would cause re-computation of identities of all records with that anonymous name, and all records linked to those records.

For all of the data records stored by the MEI, a record identifier may be used to uniquely identify the entity referred to by that record compared to other data records received from the data source. For example, in data records obtained from a hospital information system, an internally-generated patient identifier may be used as a record identifier, while in data records from a health plan membership database, a social security number can be used as a record identifier. A record identifier differs from an entity identifier because its scope is only the data records from a single data source. For example, if a person in a health plan is a patient in the hospital, their hospital record will have a different record identifier than their health plan record. Furthermore, if records from those two data sources happened to have the same record identifier, this would be no indication that the records referred to the same entity.

An additional aspect of the data record database is that one or more timestamps may be recorded along with the data record. The timestamps may indicate when the data record was last changed (e.g., when the data record is valid) and when the data record was received from the information source. The timestamps may be used to track changes in a data record which may indicate problems, such as fraud, to the operation of the MEI. The timestamps may be generated whenever a data record is added to the MEI or updated so that the historical changes in the data record may be documented. Additionally, individual attribute values may be associated with status descriptors that describe how the values should be used. For example, an attribute value with an "active" status would be used for identification, an attribute value with an "active/incorrect" status would be used for identification but not presented to the operator as being the correct value (for example, an old address that still occurs in some incoming data records), and a status of inactive/incorrect means that the value should no longer be used for matching but should be maintained to facilitate manual review. Now, a method for querying the MEI in accordance with the invention will be described.

Figure 5:
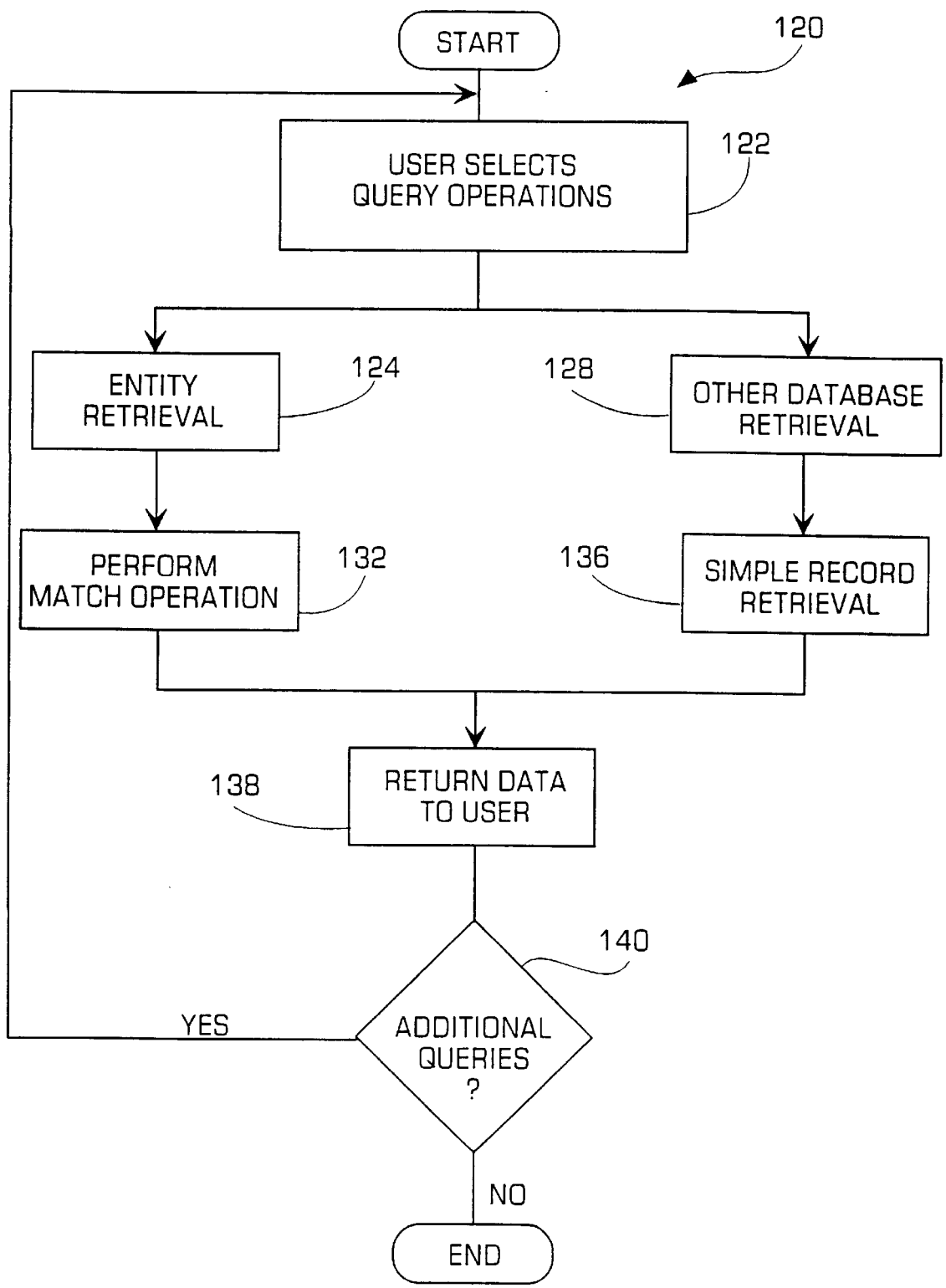
FIG. 5 is a flowchart illustrating a plurality of query operations that may be executed by the master entity index of FIG. 2.

FIG. 5 is a flowchart illustrating a method 120 for querying the master entity index in accordance with the invention. The querying operations permit the user to retrieve information from the MEI about a particular entity or data from one of the control databases. After a user selects the query operation in step 122, the user may select from a particular query operation that may include an entity retrieval operation 124, or a database query operation 128. For the entity retrieval operation, the MEI in step 132 may execute the match operation 300 described below. During the match operation, an input query may be matched against data records within the various information sources, as described in more detail below with reference to FIG. 15. For the database retrieval operation, the operator specifies a database and a set of attribute values that indicates the records of interest. The MEI in step 136 may locate those records in the specified database that has corresponding values for the specified attributes.

Additional queries may be performed by the MEI. The MEI may be queried about the number of entities in the MEI database and the MEI may respond with the number of entities in the MEI database. The MEI may also be queried about the volatility (e.g., the frequency that the data records change) of the data in the data records using a timestamp indicating the last time and number of times that the data has been changed that may be associated with each data record in the MEI. The volatility of the data may indicate fraud if the data about a particular entity is changing frequently. The MEI may also be queried about the past history of changes of the data in the data records so that, for example, the past addresses for a particular entity may be displayed. Once the queries or matches have been completed, the data is returned to the user in step 138. The MEI may then determine whether there are additional queries to be performed in step 140 and return to step 122 if additional queries are going to be conducted. If there are no additional queries, the method ends. Now, an exception processing method that may be executed by the MEI will be described.

Figure 6:
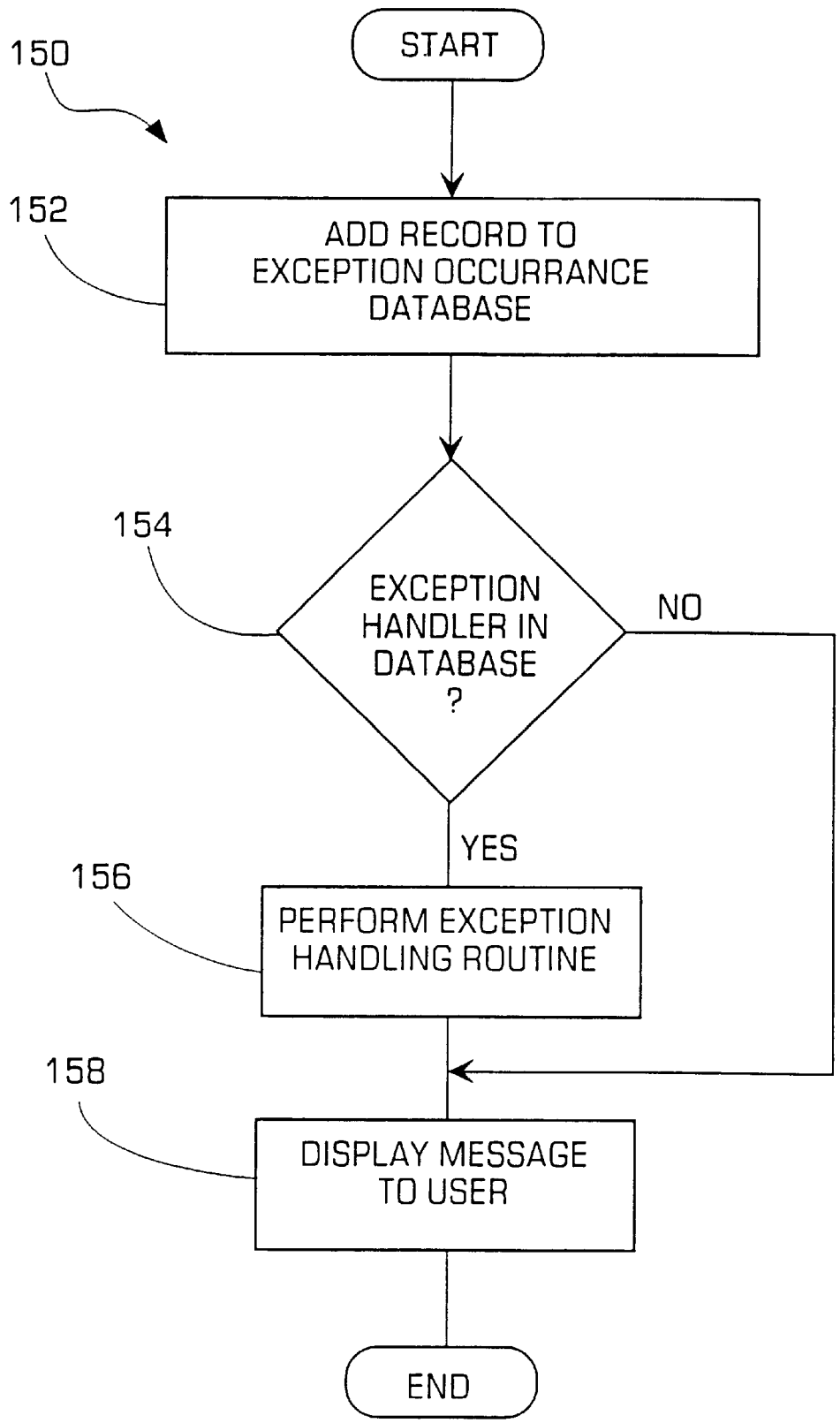
FIG. 6 is a flowchart illustrating a plurality of monitor operations that may be executed by the master entity index of FIG. 2 (where the plurality of operations is referred to as a whole as "exception processing")

FIG. 6 is a flowchart of a method for processing exceptions 150 that may be executed by the MEI. The input is data describing the occurrence of an exception, for example, an entity whose data records indicate two different values for the entity's sex. In step 152, the exception given as input to the operation is recorded in the exception occurrence database. In step 154, the MEI determines if there is an exception handling rule within the exception handling database 82 for handling the anomaly, as shown in FIG. 3 As described above, the exception handling database contains a plurality of rules for handling various types of exceptions. If an exception handling rule is in the exception handling database, in step 156, the MEI may perform the exception handling routine in the database. The routine may generate a message for the operator or may process the data using another software program. A message may be displayed to the user in step 158. If there was not an exception handling routine in the exception handling database, then a message is printed for the user in step 158. The message may require the user to perform some action or may just notify the operator of the action being taken by the MEI in response to an exception. After the message is displayed, the exception handling method has been completed. Now, the operations that may be performed be the MEI during the addition and updating data method will be described.

Figure 7:
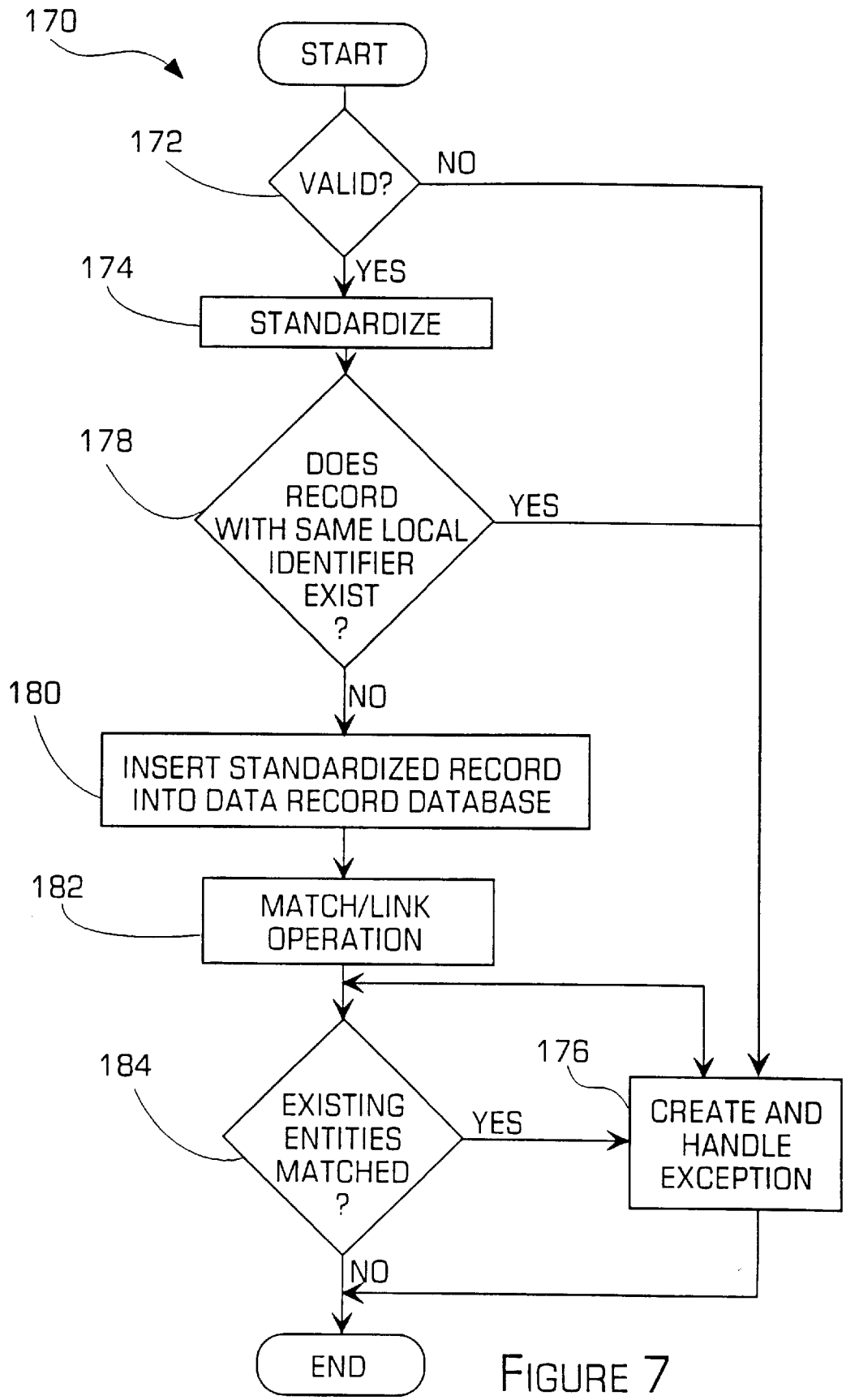
FIG. 7 is a flowchart illustrating a new data record addition operation that may be executed by the master entity index of FIG. 2.

FIG. 7 is a flowchart illustrating a method 170 for inserting a new data record into the MEI in accordance with the invention. The insertion of a new data record for a new entity usually occurs when a particular information source has determined that the new data record should not refer to the same entity as any other data record previously generated by the information source.

For inserting a new data record into the MEI, a record containing the new data is received by the MEI from the user. The MEI may then attempt to validate and standardize the fields in the new data record.

Validation in step 172 may include examining the lengths of the fields or the syntax or character format of the fields, for example, as numeric fields may be required to contain digits in specified formats. Validation may also involve validating codes in the new data record, for example, valid state abbreviations or diagnostic codes. Additional data sets may be involved in the validation process, for example, a data set containing valid customer account numbers. If the validation process fails, in step 176 an exception may be created that indicates that invalid data is received, the exception handling method described above may be performed, and processing of the insert new record operation is complete.

During standardization in step 174, the MEI may process the incoming data record to compute standard representations of certain data items. For example, the incoming data record may contain the first name of "Bill" and the MEI may add a matching field containing "William" into the incoming data record so that the MEI may match data records to William. This standardization prevents the MEI from missing data records due to, fi)r example, nicknames of people. Other kinds of standardization may involve different coding systems for medical procedures or standard representation of street addresses and other geographic locations.

The MEI may then attempt in step 178 to determine if a data record with the same record identifier already exists in the data record database. If the standardized input data has the same record identifier as an existing data record, in step 176 an exception may be created that indicates that a two data records with the same record identifier have been received, the exception handling method described above may be performed, and processing of the insert new record operation is complete. If the standardized input data does not have the same record identifier as an existing data record, then the standardized input data may be added into the MEI and a timestamp may be added to the data record in step 180. Then in step 182, the match/link method 210 described below and summarized in FIG. 15 may be performed. The match/link operation is initiated using the standardized input data, and its execution makes the results of the match/link operation available to the insert new data record operation. Then in step 184, the MEI may determine if the match/link operation linked the standardized input data record with any other records from the same information source. If so, in step 176 an exception may be created that indicates that a duplicate data record has been received, the exception handling method described above may be performed, and processing of the insert new record operation is complete. If not, the results of the match/link operation are returned to the operator and the insert new data record operation has been completed. Now, a method for updating an existing data record already in the MEI will be described.

Figure 8:
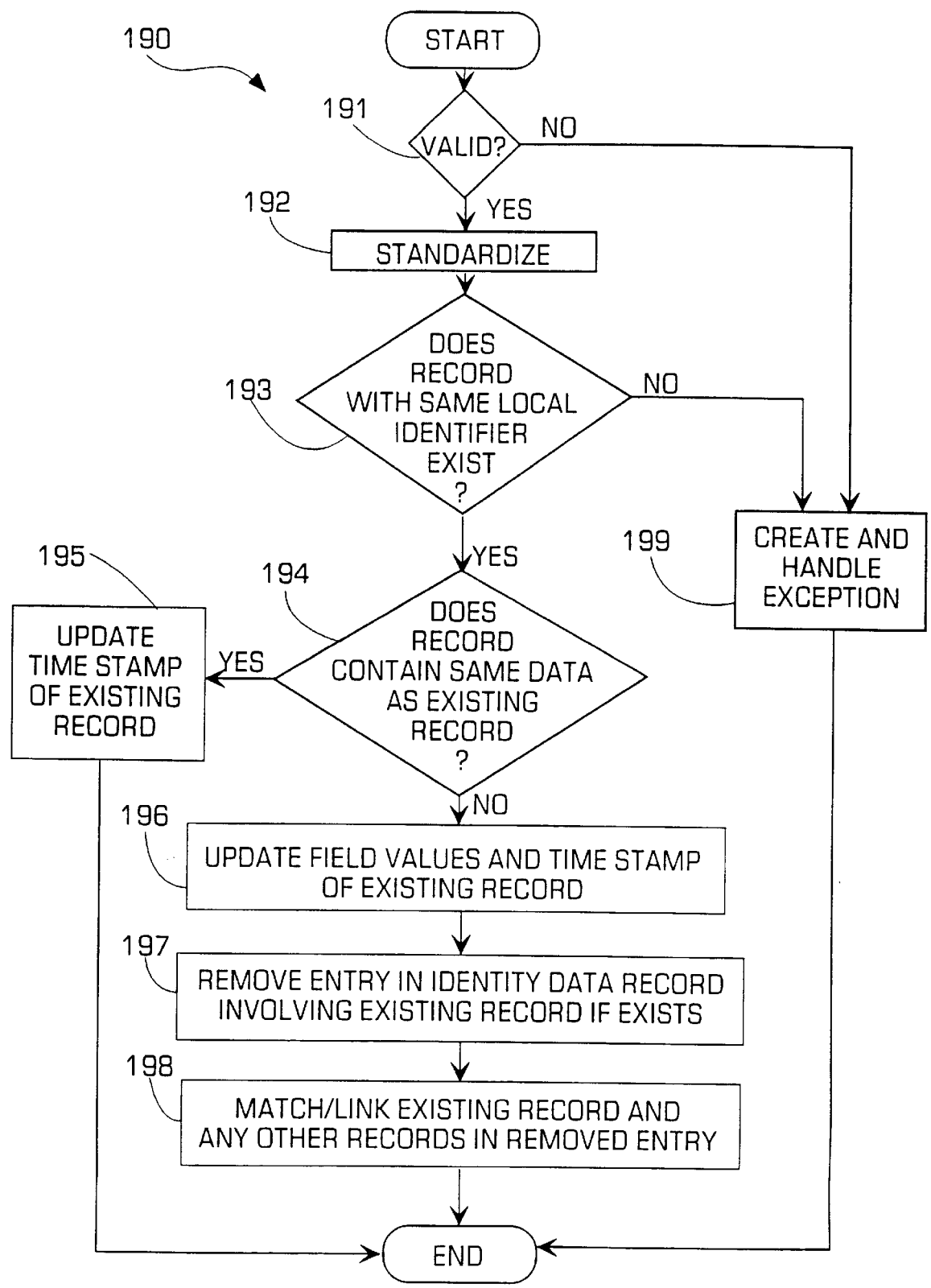
FIG. 8 is a flowchart illustrating an existing data record update operation that may be executed by the master entity index of FIG. 2.

FIG. 8 is a flowchart illustrating a method 190 for updating an existing data record containing information about a new or existing entity in accordance with the invention. Updates occur when an information source receives new information concerning an entity for which is already in its data store. The new information received by the information source will be communicated to the MEI through the update operation.

To perform the update method, the MEI may first test the input data for validity in step 191, using the same method as in step 172 of the add new record operation described in FIG. 7. If the validation process fails, in step 199 an exception may be created that indicates that invalid data is received, the exception handling method described above may be performed, and the processing of the update existing data record operation is complete. The MEI may then standardize the input data in step 192, using the same method as in step 174 of the add new record operation. The MEI may then attempt in step 193 to determine if a data record with the same record identifier as the standardized input data already exists in the data record database. If the standardized input data does not have the same record identifier as an existing data record, a new item may be added to the exception database in step 199 indicating that a duplicate data record was located, and no further processing is performed.

If the standardized input data does have the same record identifier as an existing data record, then the incoming data record is checked in step 193 to see if it contains exactly the same values for data fields as a data record already contained in the data record database. If the standardized input data does not have the same record identifier as an existing data record, in step 199 an exception may be created that indicates that a duplicate data record has been received, the exception handling method described above may be performed, and processing of the update existing data record operation is complete. If the standardized input data contains exactly the same values, then the execution of this operation cannot affect the identity database. As a result, the timestamp of the existing data record may be updated in step 195 to reflect the current time and processing of the operation is completed. If the standardized input data contains different field values than the existing record with the same record identifier, in step 196 the existing record's field values may be updated to be consistent with the values in the standardized input data, and its timestamp may be updated to reflect the current time. Since the data in the existing record has now changed, the impact on the identity database must be computed. To do this, the MEI in step 197 may first remove an entry in the identity database involving the existing record, if such an entry exists. The MEI may then perform a match/link operation in step 198 for the existing records and any other records referred to in the identity database record removed in step 197. These are the records that had been previously recorded in the identity database as referring to the same entity as the existing data record. The match/link operation performs as described in FIG. 9.

Once the match/link results have been returned in step 198 or the timestamp updated in step 195 or an exception has been generated in step 199, the add new data record operation has been completed. Now, a method for matching/linking a data record will be described.

Figure 9:
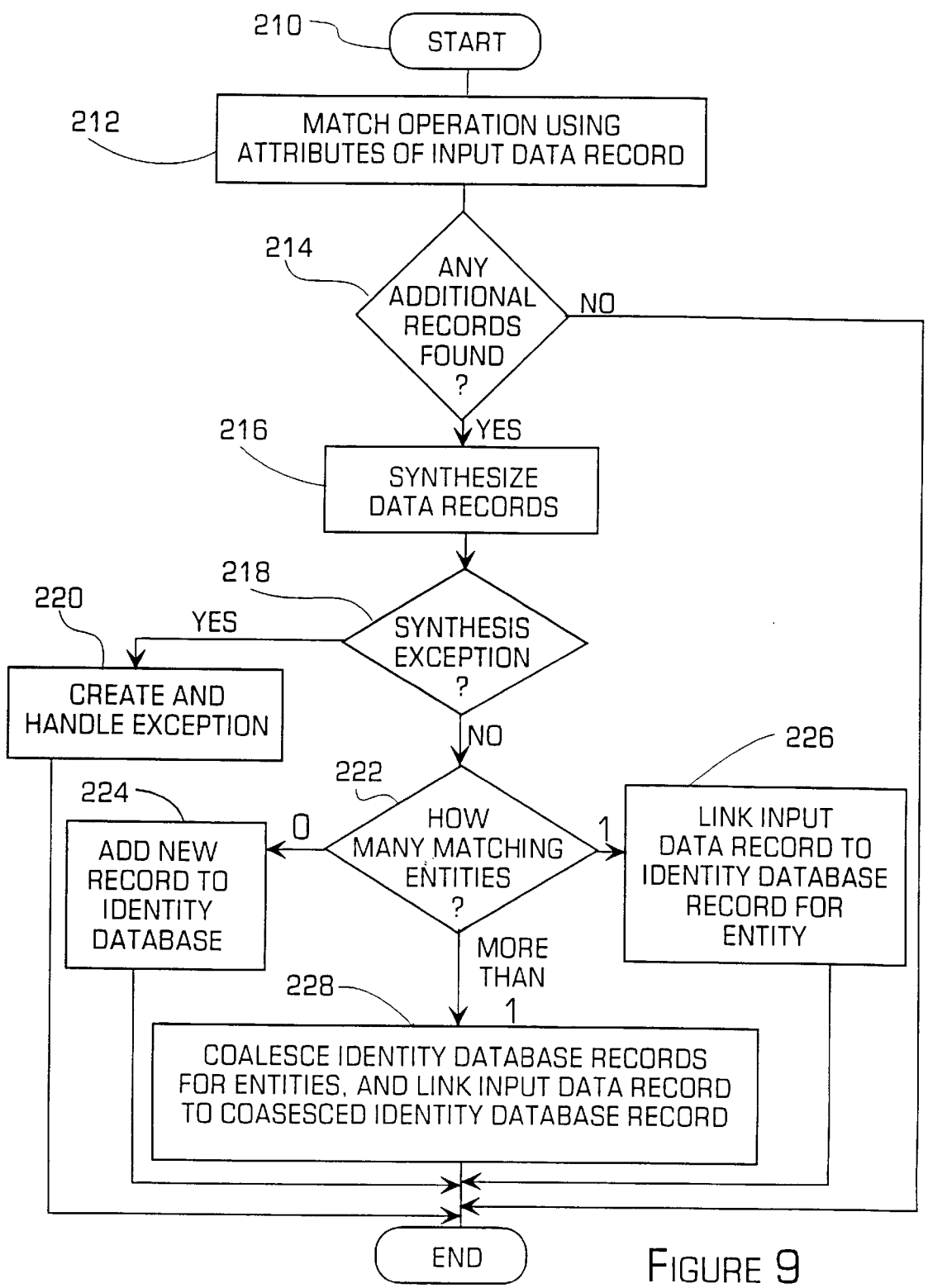
FIG. 9 is a flowchart illustrating the match/link operation that may be executed by the master entity index of FIG. 2.

FIG. 9 is a flowchart illustrating a method 210 for matching/linking a data record in accordance with the invention. This operation is used to determine the data records in the data record database that refer to the same entity as an input data record in the data record database.

To perform the match/link operation, in step 212, the MEI may perform the match operation 300 described below and diagrammed in FIG. 15. In this step, the data in the input data record is given to the match operation as its input, and the data records returned by the match operation are made available. The MEI may then in step 214 determine if any matching data records were made available. If no data records other than the input data record were returned, the match/link operation is completed. If at least one other data record was returned, the incoming data record and matching data records may be synthesized in step 216. The synthesis process combines the data values in the new record and the existing records associated with the entities. The MEI may then in step 218 determine if a condition indicating a synthesis exception has occurred, as defined by the current contents of the exception database. For example, if the incoming data record lists the sex of the entity as male while one of the matching data records lists the sex of the entity as female, and the exception database states that coalescing records with different sexes is an exceptional condition, an exceptional condition will be identified. If an exception occurs, in step 220 the MEI may create and handle the appropriate synthesis exception and the processing of the match/link operation is complete. If there are no synthesis exceptions, then in step 222, the MEI may determine the number of identity records currently held in the identity database that link data records which match the input data record. If no identity records exist, in step 224, a record may be added to the identity database with a new unique base part and a version number of 0. If exactly one identity record exists, in step 226 the MEI may update this record to add a link to the input data record. If more than one identity record exists, the MEI in step 228 may "coalesce" these records—that is, remove the existing identity records and replaces them with a single identity record linking the input data records with all the data records returned in step 212. After one of steps 224, 226, and 228 are performed, the processing of the match/link operation has been completed. Now, a method for adding an identity rule in accordance with the invention will be described.

Figure 10:
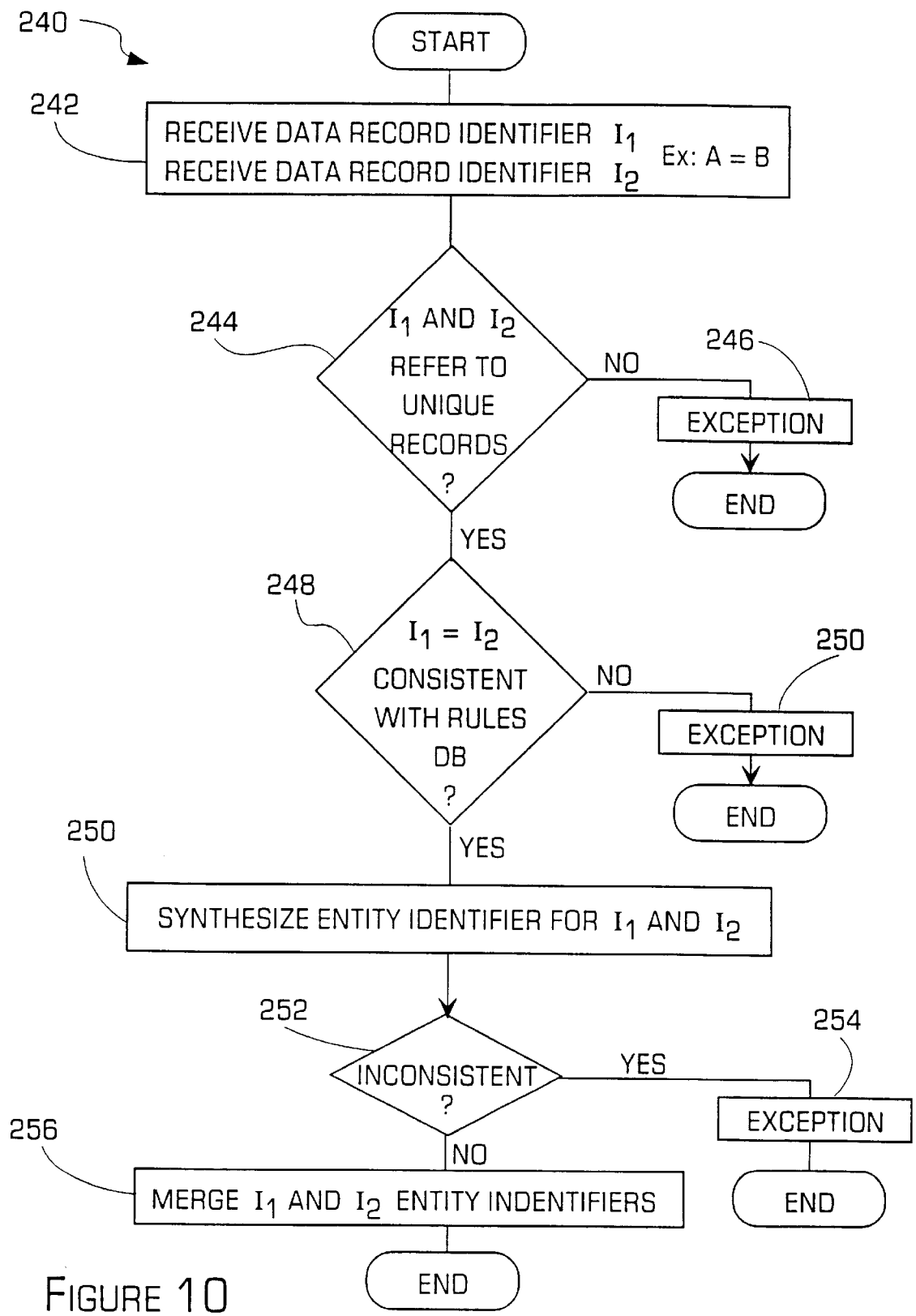
FIG. 10 is a flowchart illustrating an identity rule operation that may be executed by the master entity index of FIG. 2.

FIG. 10 is a flowchart illustrating a method 240 for adding an identity rule to the rules database of the MEI in accordance with the invention. In step 242, the MEI may receive two data record identifiers, $I_1$ and $I_2$. In this example, the identity rule is $I_1 = I_2$ which means that these two data records contain information about the same entity. The MEI may then determine if the two identifiers refer to separate unique records in step 244 and an exception routine may be executed in step 246 if an exception occurs. If there is no exception, the MEI determines if the new identity rule is consistent with the rules already contained in the rules database in step 248. If there is an exception, such as the rules database has a non-identity rule that specifies that $I_1$ and $I_2$ are not associated with each other, an exception routine is executed in step 250. If the new identity rule is consistent with the other rules in the rules database, then the entity identifier containing the two data records are synthesized in step 250 to determine if there are any inconsistencies within the associations of the two entity identifier as shown in step 252. If there are any inconsistencies in the entity identifier, an exception handling routine is executed in step 254. Otherwise, the entity identifier containing the two data records are merged together in step 256 and the method is completed. Now, a method of adding a non-identity rule to the rules database in accordance with the invention will be described.

Figure 11:
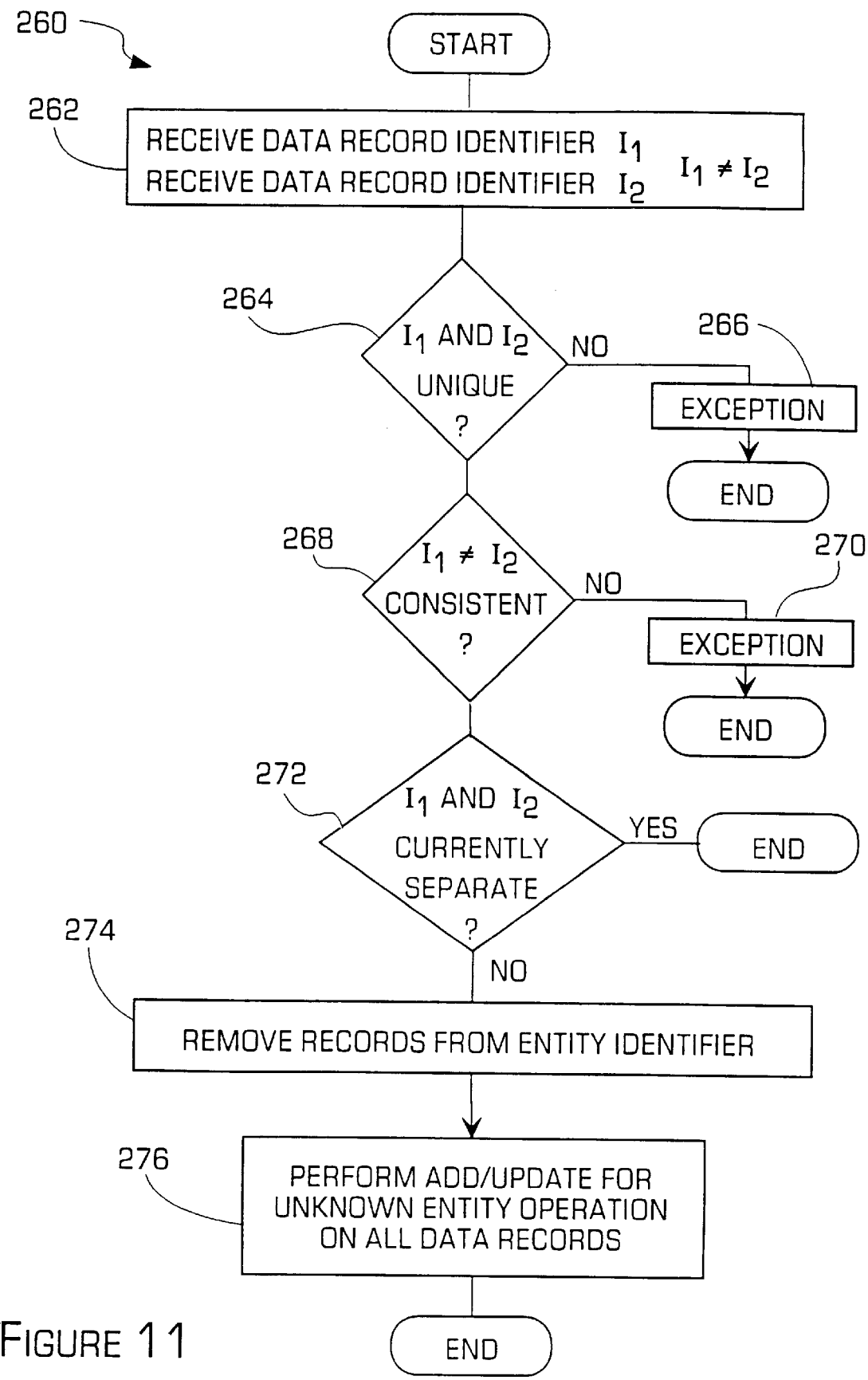
FIG. 11 is a flowchart illustrating a non-identity rule operation that may be executed by the master entity index of FIG. 2.

FIG. 11 is a flowchart illustrating a method 260 for adding a non-identity rule to the rules database of the MEI in accordance with the invention. In step 262, th(e MEI may receive two data record identifiers, $I_1$ and $I_2$. In this example, the non-identity rule is $I_1 \neq I_2$ which means that these two data records contain information that is not about the same entity. The MEI may then determine if the two identifiers refer to separate unique records in step 264 and an exception routine may be executed in step 266 if an exception occurs. If there is no exception, the MEI determines if the new non-identity rule is consistent with the rules already contained in the rules database in step 268. If the new non-identity rule conflicts with one of the existing rules in the rules database, an exception occurs in step 270. If the new non-identify rule does not conflict, then the MEI determines whether the two data records corresponding to the identifiers are currently located in different entity identifier in step 272. If the data records are already separated, then the method ends. If the data records are not currently in different entity identifiers, then in step 274 the data records identified by $I_1$ and $I_2$ as well as the other data records are removed from the entity identifier containing the data records identified by $I_1$ and $I_2$ Then, in step 276, the match/link operation, as described above, is performed on each data record removed from the entity identifier. The match/link operation may re-associate those data records previously in the entity identifier with other data records or reestablish the entity identifier without either $I_1$ or $I_2$. Now, a method for deleting data records in accordance with the invention will be described.

Figure 12:
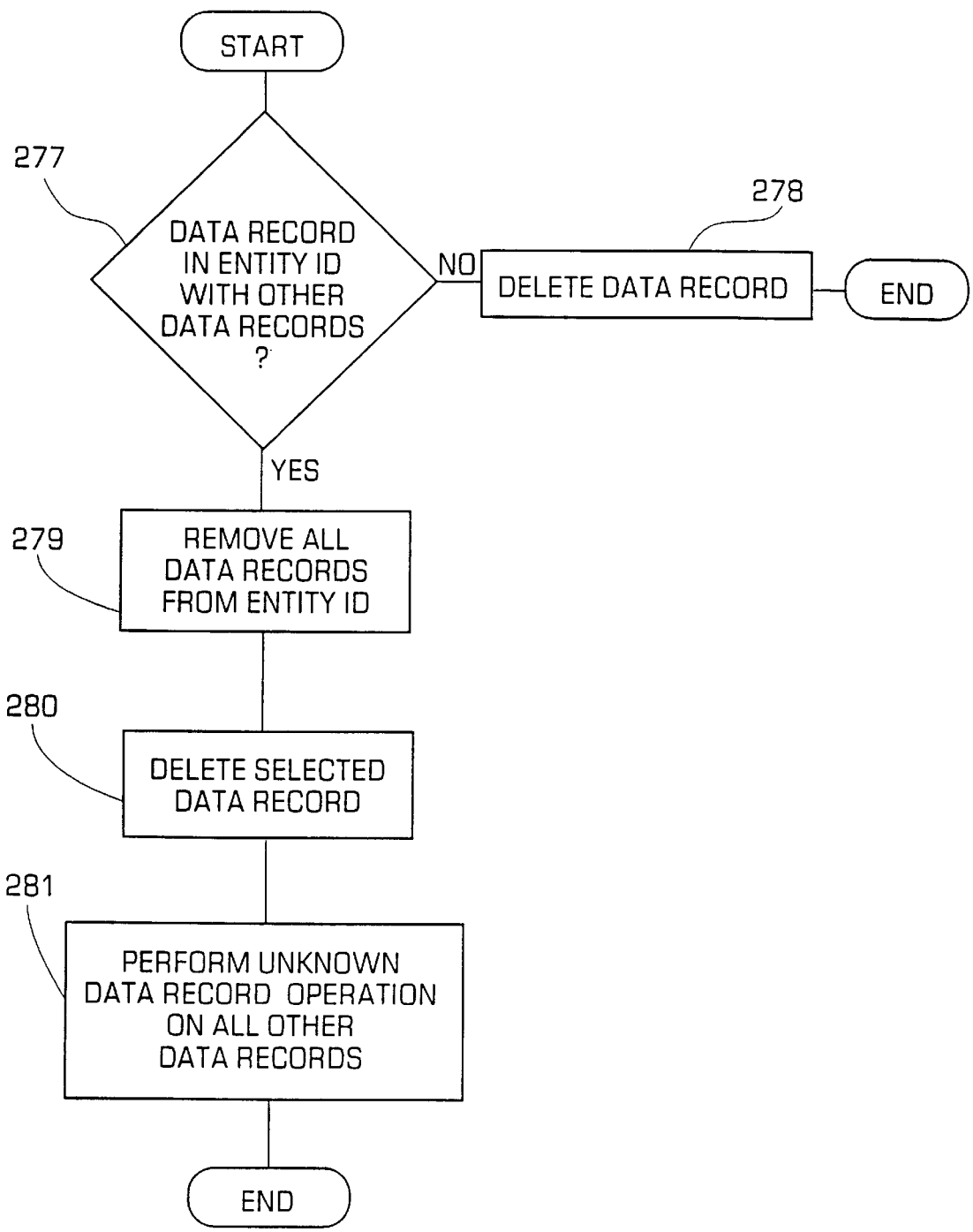
FIG. 12 is a flowchart illustrating a delete operation that may be executed by the master entity index of FIG. 2.

FIG. 12 is a flowchart illustrating a method for deleting a data record in accordance with the invention. In step 277, the MEI determines if the data record to be deleted is located within an entity identifier with other data records. If there are no other data records in the entity identifier, then in step 278, the data record may be deleted and the method is completed. If there are other data records associated with the data record to be deleted, then in step 279, all of the data records are removed from the entity identifier, and in step 280, the selected data record may be deleted. Then in step 281, a match/link operation, as described above, is executed for the other data records previously in the entity identifier. The match/link operation may re-associate those data records previously in the entity identifier with other data records or reestablish the entity identifier without the deleted data records. Now, a method for querying the MEI for data records and querying the MEI for information from the other control databases will be described.

Figure 13:
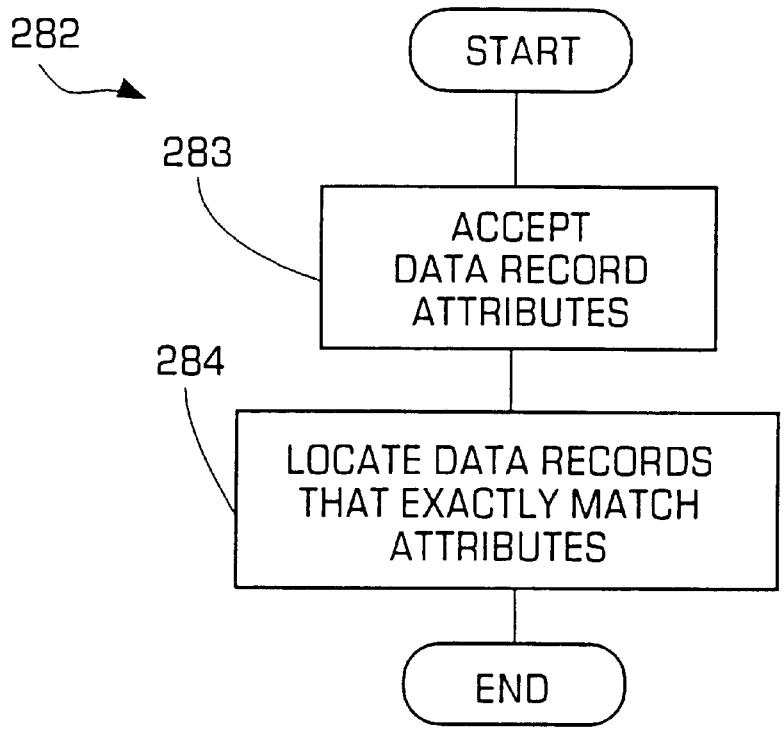
FIG. 13 is a flowchart illustrating a data record retrieval operation that may be executed by the master entity index of FIG. 2.

FIG. 13 is a flowchart illustrating a method 282 for querying the MEI system for data records about a particular entity. In step 283, the MEI accepts a query from the user that contains entity attributes. These attributes correspond to data fields within the data records stored by the MEI. In step 284, the MEI retrieves data records which have data fields that match the attributes provided in the query and displays those located data records for the user. The details of the matching method will be described below in method 300 and illustrated in FIG. 15.

Figure 14:
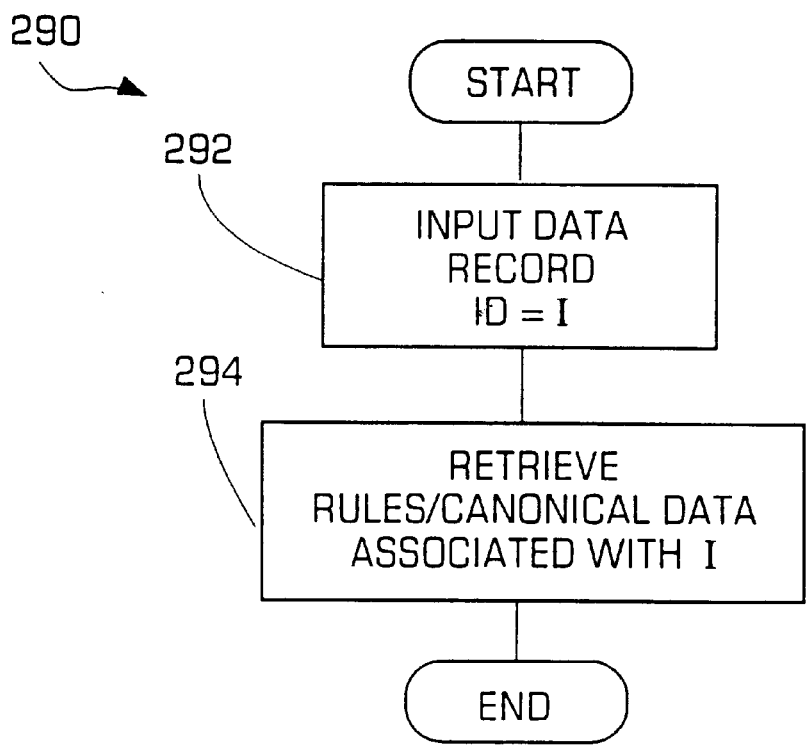
FIG. 14 is a flowchart illustrating a database retrieval operation that may be executed by the master entity index of FIG. 2.

FIG. 14 is a flowchart illustrating a method 290 for querying the MEI to locate information in the databases of the MEI. In step 292, the operator may input a database and values for fields maintained in records of the database. In step 294, the MEI may retrieve any information from the control databases relating to the data record identifier I. For example, if the user queries the MEI about rules in the rules database containing identifier I, the MEI may return the identity rule I=M and the non-identity rule I≠N. Now, a method for computing the match operation data records in the MEI database based on a set of query attributes will now be described.

Figure 15:
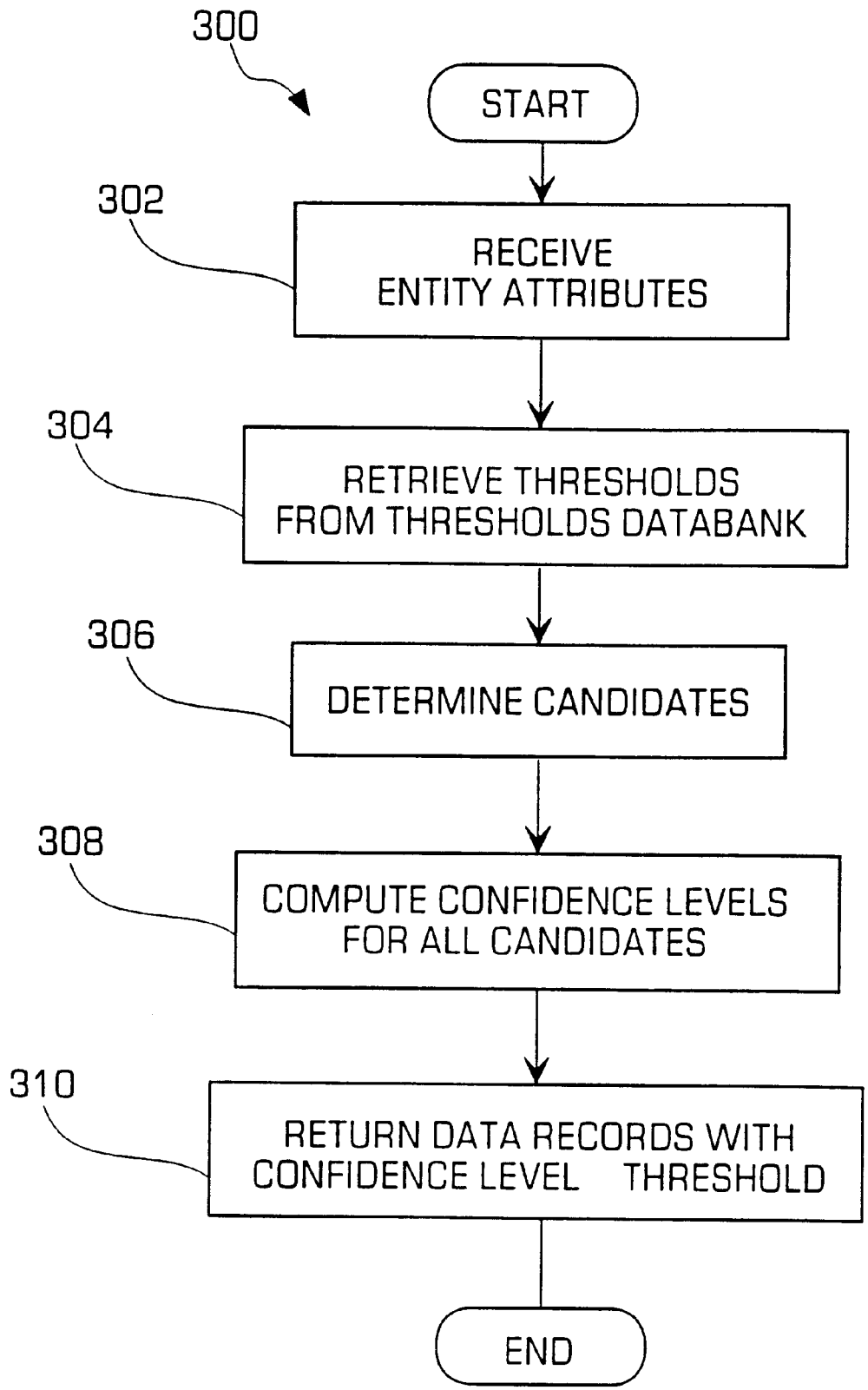
FIG. 15 is a flowchart illustrating a match operation that may be executed by the master entity index of FIG. 2.

FIG. 15 is a flowchart illustrating a method 300 for finding matching data records in the MEI database based on a set of query attributes in accordance with the invention. In step 302, the MEI accepts a query in the form of a list of entity attributes and associated values. Examples of entity attributes in a health care example could be patient number, first name, last name, or phone number, or if the database is a parts inventory, the part number, or the manufacturer for the part. In step 304, the threshold being used by the matching operation may be retrieved from the thresholds database shown in FIG. 3. As described above, the thresholds database permits different threshold levels to be used depending on how close a match is desired by the operator.

Once the threshold has been set, in step 306, a plurality of candidates may be retrieved. To select the candidates, the input attributes are divided into combinations of attributes, such as the last name and phone number of the patient, the first name and last name of a patient, and the first name and phone number of the patient. The data records in the MEI database are exactly matched against each combination of attributes to generate a plurality of candidate data records. Determining candidates from several combinations of attributes permits more fault tolerance because a data record may have a misspelled last name, but will still be a candidate because the combination of the first name and the phone number will locate the data record. Thus, a misspelling of one attribute will not prevent the data record from being a candidate. Once the group of candidates has been determined, the confidence level for each candidate data record may be calculated.

The confidence level may be calculated based on a scoring routine, which may use historical data about a particular attribute, such as a last address. Thus, if the current address and past addresses match a query, the confidence level is higher than that for a data record with the same current address but a different old address. The scoring routine may also give a higher confidence level to information more likely to indicate the same entity, such as a social security number. The scoring routine may add the confidence level for each attribute to generate a confidence level value for a candidate record. Once the confidence levels have been calculated, any data records with confidence levels higher than the threshold level are displayed for the user in step 310. The method of matching attributes to data records within the MEI database has been completed.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A system for associating a data record from an information source into a database, the database containing a plurality of data records, the system comprising:

means for receiving a data record from an information source, the received data record having a predetermined number of fields containing information about a particular entity;

means for comparing selected fields within the received data record with corresponding fields within the data records already in the database;

means, responsive to comparison, for identifying data records already in the database having data within some of the selected fields that match to the data in the fields of the received data record as possible matching candidates, the identifying means further comprising one or more control databases for identifying errors in the data contained in one or more fields of the received data record in order to correct the data in the received data record and means for matching the corrected data in the received data record with the data records already in the database; and means for scoring the identified matching candidates using a predetermined scoring criteria which measures a likelihood of a match between the received data record and the data records in the database based on the selected fields to determine if the received data record and a data record in the database contains information about the same entity thereby associating data records about the same entity despite errors contained in the data records.

2. The system of claim 1, wherein said scoring means comprises means for generating a score indicating whether each possible matching candidate contains information about the same entity as the received data record despite errors in the possible matching candidate or the received data record, and means for generating a link between the possible matching candidate with the received data record when the generated score is above a predetermined threshold level.

3. The system of claim 2, wherein the means for generating a link further comprises means for querying the data record database to identify any potential matches between the incoming data record and the data records in the data record database, means for merging the incoming data record with a data record in the data record database when a match is identified, and, when a match is not identified, means for allocating new storage space to the incoming data record and means for adding the incoming data record into the new storage space.

4. The system of claim 2, further comprising means for storing the links between the received data record and the data records already in the database in a separate database from said data records.

5. The system of claim 4 further comprising means for performing another scoring for the received data record and the data records in the database using a different threshold value comprising means for deleting the stored links, means for changing the threshold level and means for regenereating links for a data record when the second score is above the changed threshold level.

6. The system of claim 1, wherein said information source further comprises a plurality of information sources having data records containing fields and wherein the comparison means comprises means for comparing the fields in the data records from the plurality of information sources to fields in data records already in the database in order to associate the data records from the plurality of information sources with the data records in the database despite errors in the data records.

7. The system of claim 1, wherein said one or more databases comprises a rules database for storing rules for automatically determining the associations between data records containing information about the same entity, a links database for storing said associations between the data records about a same entity in the data record database, an exception database for storing an action to be taken when a received data record cannot be processed, an anonymous name database for storing known anonymous names which appear in the data records in the data records database, a canonical name database for storing a relationship between a full given name and a nickname that is in a data record in the data record database, and a threshold database for storing a threshold used for the comparison of the data records.

8. The system of claim 1 further comprising means for standardizing the information in an incoming data record before the incoming data record is compared to the other data records in the database in order to reduce the likelihood of a mismatch.

9. The system of claim 1 further comprising means for incorporating the incoming data record into a data record database.

10. The system of claim 9, wherein the incorporating means comprises means for adding a data record containing information about a new entity into the data record database comprising means for determining if the information in the incoming data record matches information in the data record database, means for allocating storage space in the data records database to the data record containing information about the new entity, and means for storing the data record containing information about the new entity in the allocated storage space.

11. The system of claim 9, wherein said incorporating means comprises means for adding a data record containing information about an entity that already has a data record in the data record database comprising means for determining if there are matching data records in the data records database, means for merging the data records in the data records database with the incoming data record if a match is determined, and means for updating a links database to contain an association between the incoming data record and the data records already in the data record database.

12. The system of claim 9, wherein the incorporating means comprises means for adding a data record containing information about an unknown entity into the data record database.

13. The system of claim 1 further comprising a rules database containing rules for determining a match between an incoming data record and data records in the data record database based on the information in the data records, and means for updating the rules database with additional rules.

14. The system of claim 13, wherein said rule database updating means comprises means for comparing a new rule with a rule already in the rules database and means for synthesizing the data records associated with the new rule with the data records associated with a previous rule in the rules database.

15. A system for associating data records from a plurality of sources containing information about the same entity together despite errors in the information contained in the data records, the system comprising:

means for comparing an incoming data record to a database of data records based on a comparison of selected fields in the incoming data record and in the data records in the database to identify matching data records based on the selected fields; and means for controlling the comparison means comprising one or more control databases for identifying errors in the data contained in one or more fields of the received data record in order to correct the data in the received data record and means for matching the corrected data in the received data record with the data records already in the database, the one or more control databases comprises a rules database for storing rules for automatically determining the associations between data records containing information about the same entity, a links database for storing said associations between the data records about a same entity in a separate database from the data record database, an exception database for storing an action to be taken when a received data record cannot be processed, an anonymous name database for storing known anonymous names which appear in the data records in the data records database, a canonical name database for storing a relationship between a full given name and a nickname that is in a data record in the data record database, and a threshold database for storing a threshold used for the comparison of the data records.

16. A method for associating a data record from an information source into a database, the database containing a plurality of data records, the method comprising:

receiving a data record from an information source, the received data record having a predetermined number of fields containing information about a particular entity;

comparing selected fields within the received data record with corresponding fields within the data records already in the database;

identifying data records already in the database, based on the comparison, having data within some of the selected fields that match to the data in the fields of the received data record as possible matching candidates, the identifying further comprising identifying errors in the data contained in one or more fields of the received data record using one or more control databases in order to correct the data in the received data record and matching the corrected data in the received data record with the data records already in the database; and scoring the identified matching candidates using a predetermined scoring criteria which measures a likelihood of a match between the received data record and the data records in the database based on the selected fields to determine if the received data record and a data record in the database contains information about the same entity thereby associating data records about the same entity despite errors contained in the data records.

17. The method of claim 16, wherein said scoring comprises generating a score indicating whether each possible matching candidate contains information about the same entity as the received data record despite errors in the possible matching candidate or the received data record, and generating a link between the possible matching candidate with the received data record when the generated score is above a predetermined threshold level.

18. The method of claim 17, wherein the generating a link further comprises querying the data record database to identify any potential matches between the incoming data record and the data records in the data record database, merging the incoming; data record with a data record in the data record database when a match is identified, and, when a match is not identified, allocating new storage space to the incoming data record and adding the incoming data record into the new storage space.

19. The method of claim 17, further comprising storing the links between the received data record and the data records already in the database in a separate database from said data records.

20. The method of claim 19 further comprising performing another scoring for the received data record and the data records in the database using a different threshold value comprising deleting the stored links, changing the threshold level and regenereating links for a data record when the second score is above the changed threshold level.

21. The method of claim 16, wherein said information source further comprises a plurality of information sources having data records containing fields and wherein the comparison comprises comparing the fields in the data records from the plurality of information sources to fields in data records already in the database in order to associate the data records from the plurality of information sources with the data records in the database despite errors in the data records.

22. The method of claim 16, wherein said one or more databases comprises a rules database for storing rules for automatically determining the associations between data records containing information about the same entity, a links database for storing said associations between the data records about a same entity in the data record database, an exception database for storing an action to be taken when a received data record cannot be processed, an anonymous name database for storing known anonymous names which appear in the data records in the data records database, a canonical name database for storing a relationship between a full given name and a nickname that is in a data record in the data record database, and a threshold database for storing a threshold used for the comparison of the data records.

23. The method of claim 16 further comprising standardizing the information in an incoming data record before the incoming data record is compared to the other data records in the database in order to reduce the likelihood of a mismatch.

24. The method of claim 16 further comprising incorporating the incoming data record into a data record database.

25. The method of claim 24, wherein the incorporating comprises adding a data record containing information about a new entity into the data record database comprising determining if the information in the incoming data record matches information in the data record database, allocating storage space in the data records database to the data record containing information about the new entity, and storing the data record containing information about the new entity in the allocated storage space.

26. The method of claim 24, wherein said incorporating comprises adding a data record containing information about an entity that already has a data record in the data record database comprising determining if there are matching data records in the data records database, merging the data records in the data records database with the incoming data record if a match is determined, and updating a links database to contain an association between the incoming data record and the data records already in the data record database.

27. The method of claim 24, wherein the incorporating comprises means for adding a data record containing information about an unknown entity into the data record database.

28. The method of claim 16 further comprising using a rules database containing rules for determining a match between an incoming data record and data records in the data record database based on the information in the data records, and updating the rules database with additional rules.

29. The method of claim 28, wherein said rule database updating comprises comparing a new rule with a rule already in the rules database and synthesizing the data records associated with the new rule with the data records associated with a previous rule in the rules database.

\* \* \* \* \*